Figure 3:
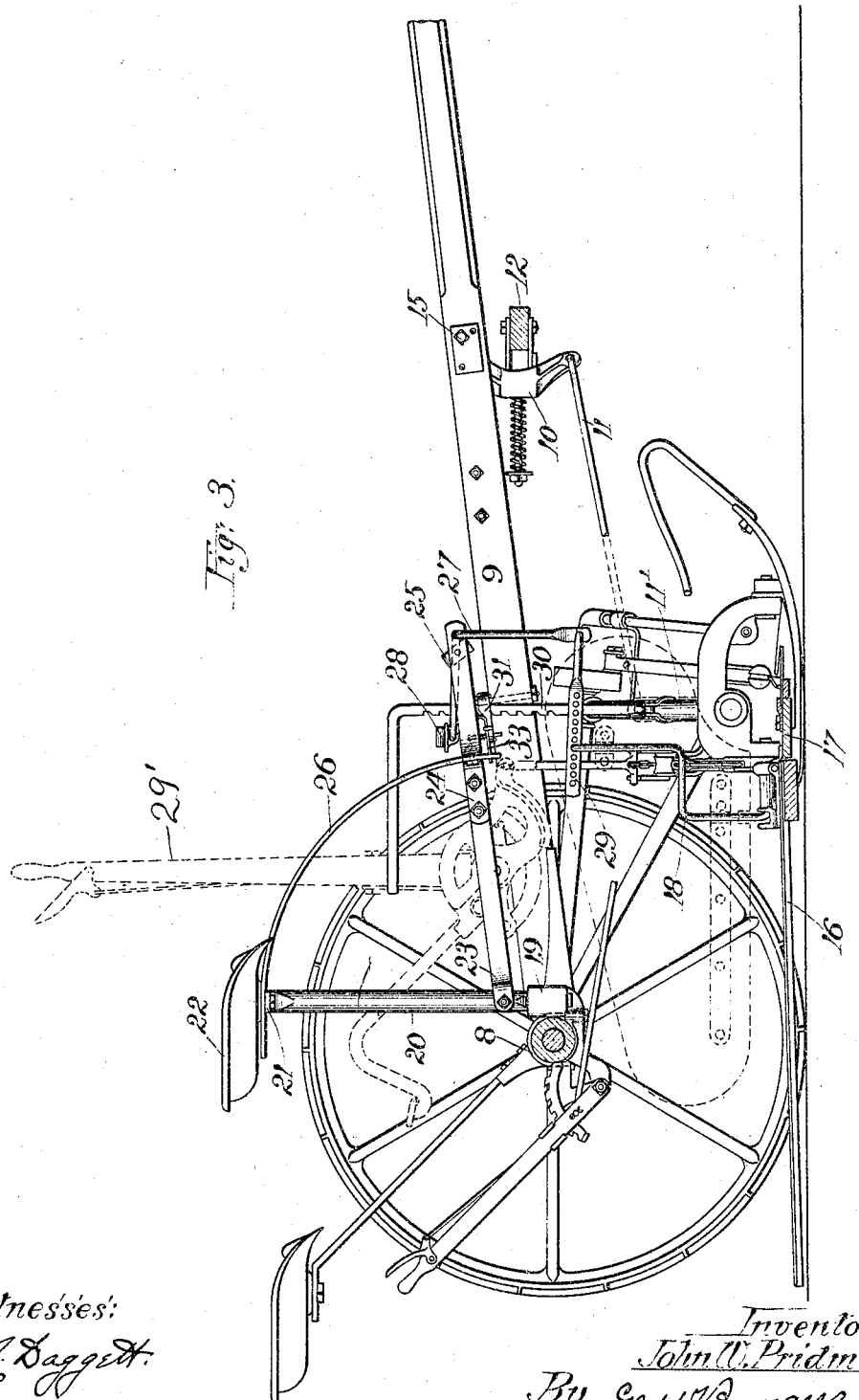

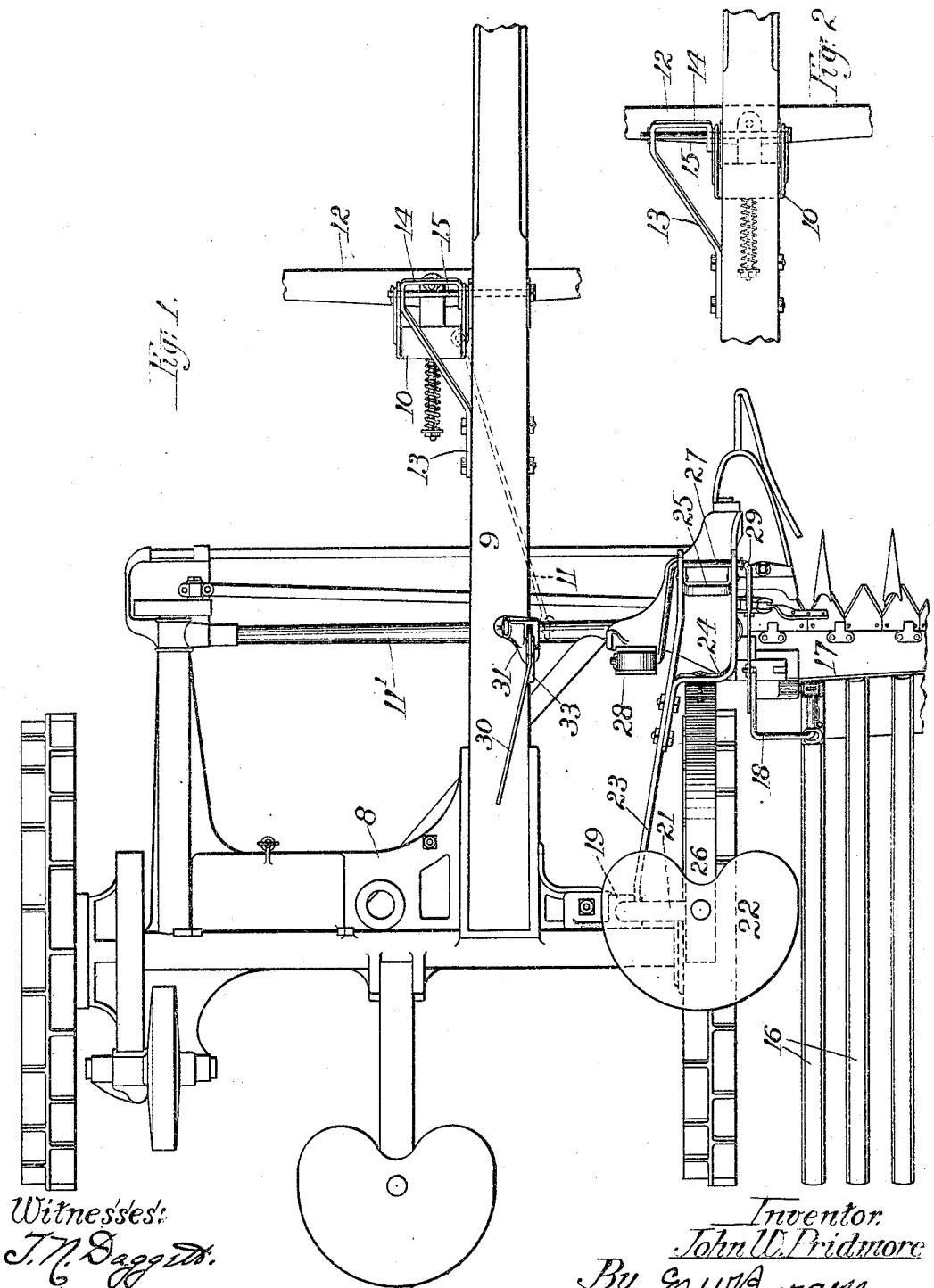

No. 793,742. PATENTED JULY 4, 1905.
J. W. PRIDMORE.
REAPING ATTACHMENT FOR MOWERS.
APPLICATION FILED FEB. 23, 1905.

3 SHEETS—SHEET 2.

Witnesses:
T. M. Daggett
T. H. Alfredo

Inventor:
John W. Pridmore
By E. W. Burgess
Atty.

No. 793,742. PATENTED JULY 4, 1905.
J. W. PRIDMORE.
REAPING ATTACHMENT FOR MOWERS.
APPLICATION FILED FEB. 23, 1905.
3 SHEETS—SHEET 3.
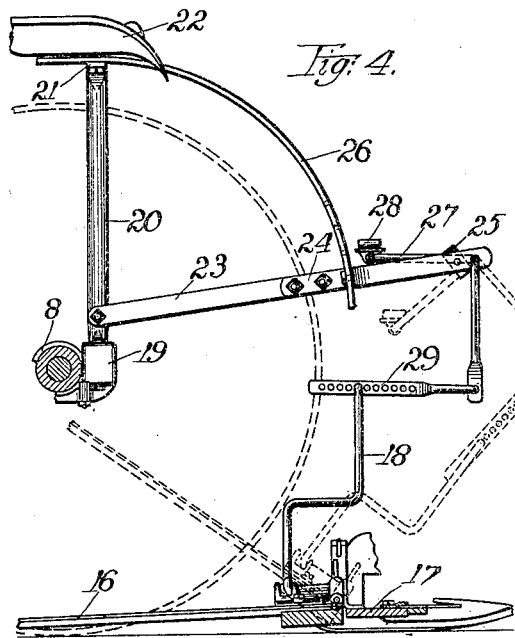
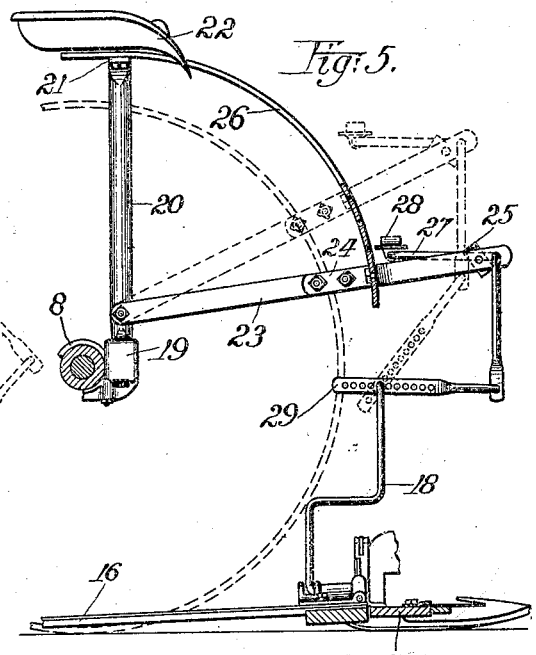
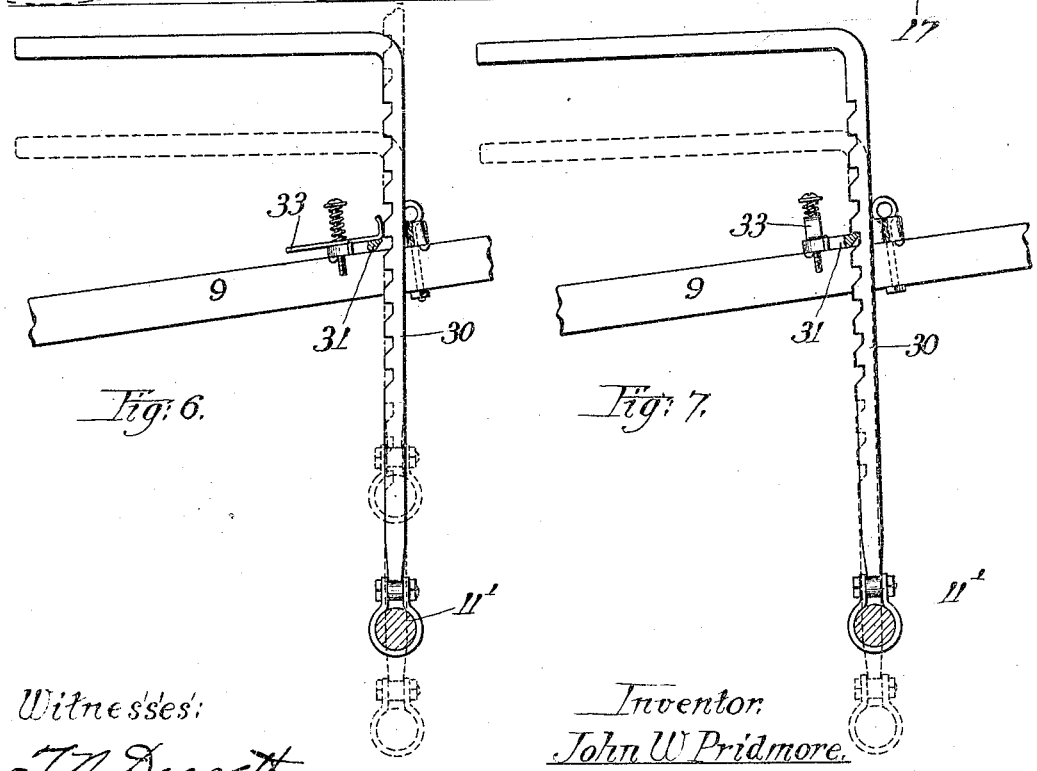
Witnesses:
J. N. Daggett.
T. H. Alfred.
Inventor,
John W. Pridmore.
By E. W. Burgess
Atty.

No. 793,742. Patented July 4, 1905.

UNITED STATES PATENT OFFICE.

JOHN W. PRIDMORE, OF CHICAGO, ILLINOIS, ASSIGNOR TO INTERNATIONAL HARVESTER COMPANY, A CORPORATION OF NEW JERSEY.

REAPING ATTACHMENT FOR MOWERS.

SPECIFICATION forming part of Letters Patent No. 793,742, dated July 4, 1905.

Application filed February 23, 1905. Serial No. 246,879.

*To all whom it may concern:*

Be it known that I, JOHN W. PRIDMORE, a citizen of the United States, residing at Chicago, in the county of Cook and State of Illinois, have invented certain new and useful Improvements in Reaping Attachments for Mowers, of which the following is a specification, reference being had to the accompanying drawings, forming a part thereof.

My invention relates to improvements in reaping attachments for mowers; and its object is to improve the construction of the foot-lever mechanism for manipulating the dropper attachment, to provide an adjustable foot-rest attachment, to provide means independent of the regular adjusting means for retaining the cutter-bar in an elevated position and also mechanism for rendering such means inactive, and to provide an adjustable draft attachment that may be used either for mowing or reaping.

The invention consists in the mechanism shown by the drawings and described in the specification accompanying this application, in which—

Figure 1 is a top plan view of a part of a mower with my improved devices attached thereto. Fig. 2 is a plan view of the draft connection. Fig. 3 is a side view of a part of the mower, showing my improvements in elevation. Fig. 4 is a side elevation of the foot-lever and foot-rest mechanism. Fig. 5 is a side elevation showing the manner of adjusting the position of the foot-rest attachment. Figs. 6 and 7 represent details of the mechanism for controlling the movement of the cutter-bar, like numerals representing the same parts.

The main frame of the mower is represented by 8.

9 is the pole, secured to the main frame.

10 is a common form of draft attachment pivoted upon the pole, and 11 is the draft-link connecting the draft attachment with the connecting-bar 11' of the coupling-frame of the cutting apparatus, and 12 is the draft-evener, yieldingly connected with the draft attachment 10 in a common form.

The foregoing is a description of a common form of draft attachment as used upon mowing-machines. When this class of machines is provided with reaping attachments, it is necessary to change the line of draft by moving it stubbleward to provide more room for the draft-animal upon the grainward side of the machine. To provide for such sidewise movement of the draft attachment, I secure a metal bracket 13 to the stubbleward side of the pole. The bracket 13 has a U-shaped head 14 with openings to receive a through-bolt 15 having sufficient length to pass through the side arms of the draft attachment 10, the pole 9, and the U-shaped head of the bracket 13. When the machine is being used as a mower, the bracket 10 occupies the position shown in Fig. 2, wherein the side arms thereof are embracing the pole. When the machine has the reaping attachment applied thereto, the through-bolt 15 is removed and the bracket 10 is moved stubbleward and its side arms caused to embrace the U-shaped head of the bracket 13, and the through-bolt 15 secures the parts in place, as shown in Fig. 1.

The reaping attachment consists of a slatted platform 16, pivotally connected with the cutter-bar 17 and extending rearward therefrom. Pivotally connected with the inner forward corner of the platform is a crank-arm 18, having a swinging movement laterally relative to the line of draft for the purpose of allowing the cutter-bar to be moved to an approximately vertical position and adapted when moved in a fore and aft direction to rock the slatted platform about its pivotal connection.

The main frame of the mower is provided with a socket 19, adapted to receive the lower end of a standard 20, having a laterally-extending arm portion 21 at its upper end, to which a seat 22 is secured. Pivotally connected near the lower end of the standard 20 is the rear end of the bar 23, that extends forward and forms, in combination with the Z-shaped member 24, secured thereto, and the spacing-bar 25, a foot-rest for the operator.

Secured to the arm portion 21 of the standard 20 is the upper end of a brace 26, that curves forward and downward concentric with the pivotal connection between the bar 23 and the standard 20 and having the part 24 of the foot-rest adjustably secured to its lower end. A rocking double crank-lever 27 is provided with bearings in the parts 23 and 24 and has a foot-piece 28 loosely connected with one of the crank-arms and an adjustable link 29 connecting the opposite arm with the upper end of the crank-arm 18. The foot-rest, together with the rocking double crank-lever that controls the movement of the slatted platform, is adjustable upon the curved brace 26 for the purpose or regulating the distance between the seat and such parts to accommodate operators having more or less reach of limbs.

In operating the machine as a mower it is necessary that the cutting apparatus be allowed to float freely upon the ground and follow the inequalities of its surface. The usual hand-operated lever 29', mounted upon the mower-frame, operates to adjust the cutting apparatus in the usual way when being used as a mower. It is the common practice to allow the cutting apparatus to float upon the ground when cutting, and it is only sustained by the lifting-lever when raised to its extreme height. When the reaping attachment is used, the cutting apparatus is held at some determined distance above the surface of the ground, and part of my invention relates to mechanism provided to secure that result. A toothed bar 30 is pivotally connected with the coupling-frame at its lower end and has its upper end bent rearwardly for the purpose of bringing it within easy reach of the foot of the operator. The bar extends upward along the side of the pole, and secured to the pole is a loop 31, with which the teeth of the bar are adapted to engage for the purpose of holding the cutting apparatus in any desired position above the surface of the ground. A spring operates to yieldingly press the bar in a direction to engage with the loop, and the operator by pressing forward on the rearwardly-extending portion may disengage it therefrom. The loop 31 is provided with a spring-pressed latch-piece 33, that is inoperative when the machine is being operated as a reaper and it is desired to hold the cutting apparatus at a distance above the ground; but when operated as a mower and it is desirable to have the cutting apparatus freely float upon the surface of the ground the latch-piece is adapted to be swung upon its pivot in a manner to prevent the teeth of the bar engaging with the loop, as shown in Fig. 6.

What I claim as my invention, and desire to secure by Letters Patent, is—

1. In a reaping attachment for mowers, the combination of a seat, a platform, means comprising a foot-lever adapted to tilt said platform, said foot-lever being adjustable bodily toward and from said seat.

2. In a reaping attachment for mowers, the combination of a seat, a platform, a foot-support, a lever pivoted on said foot-support and connected with said platform and adapted to rock it about its connections, and means for adjusting said foot-support and lever toward or from said seat.

3. In a reaping attachment for mowers, the combination of a seat, a platform, a foot-support, a lever pivoted on said foot-support and adjustably connected with said platform and adapted to rock it about its connections, and means for adjusting said foot-support and lever toward or from said seat.

4. In a reaping attachment for mowers, having a rising-and-falling cutting apparatus suitably connected therewith, the combination of a platform pivotally connected with the rear side of said cutting apparatus, means for rocking said platform about its connections, a seat-supporting arm suitably mounted on said mower, a foot-rest having its rear end pivotally connected with said arm toward its lower end, a brace concentrically arranged about said connection and having its upper end secured to said seat-supporting arm, and the forward end of the foot-rest adjustably secured to the lower end of the brace.

5. In a reaping attachment for mowers, having a rising-and-falling cutting apparatus suitably connected therewith, the combination of a platform pivotally connected with the rear side of said cutting apparatus, means for rocking said platform about its connections, comprising a foot-lever suitably connected therewith, a seat, a seat-supporting arm suitably mounted on said mower, a foot-rest having its rear end pivotally connected with said arm toward its lower end, a brace concentrically arranged about said connection and having its upper end secured to said seat-supporting arm, the forward end of the foot-rest being adjustably secured to the lower end of the brace, and said foot-lever pivotally mounted on said foot-rest.

6. In a reaping attachment for mowers, having a rising-and-falling coupling-frame suitably connected therewith, the combination of a cutting apparatus connected with the coupling-frame and adapted to normally float upon the surface of the ground, a platform pivotally connected with the rear side of said cutting apparatus, a lever mounted on the mower-frame for raising or lowering said coupling-frame and cutting apparatus, and other means connected with said coupling-frame and said mower-frame for sustaining said cutting apparatus at any desired height from the ground independent of said first-mentioned means.

7. In a reaping attachment for mowers having a rising-and-falling coupling-frame suitably connected therewith, the combination of a cutting apparatus connected with the coupling-frame and adapted to normally float upon the surface of the ground, a platform pivotally connected with the rear side of said cutting apparatus, a lever mounted on the mower-frame for raising or lowering said coupling-frame and cutting apparatus, and other means connected with said coupling-frame and said mower-frame for sustaining said cutting apparatus at any desired height from the ground independent of said lever, said means comprising a toothed bar pivotally connected with the coupling-frame, and a part secured to the mower-frame adapted to engage with said toothed bar.

8. In a reaping attachment for mowers having a rising-and-falling coupling-frame suitably connected therewith, the combination of a cutting apparatus connected with the coupling-frame and adapted to normally float upon the surface of the ground, a platform pivotally connected with the rear side of said cutting apparatus, a lever mounted on the mower-frame for raising and lowering said coupling-frame and cutting apparatus, and other means connected with said coupling-frame and said mower-frame for sustaining said cutting apparatus at any desired height from the ground independent of the said lever, said means comprising a toothed bar pivotally connected with the coupling-frame, a part secured to the mower-frame adapted to engage with said toothed bar, and a guard-piece adapted to be interposed between said sustaining part and bar, whereby the notched portion of the bar is rendered inoperative.

9. In a reaping attachment for mowers having a rising-and-falling coupling-frame suitably connected therewith, the combination of a cutting apparatus connected with the coupling-frame and adapted to normally float upon the surface of the ground, a platform pivotally connected with the rear side of said cutting apparatus, a lever mounted on the mower-frame operative for raising and lowering said coupling-frame and cutting apparatus, and other means connected with said coupling-frame and said mower-frame for sustaining said cutting apparatus at any desired height from the ground independent of said lever, said means comprising a toothed bar pivotally connected with the coupling-frame, a part secured to the mower-frame adapted to engage with said toothed bar, and a spring-pressed guard-piece adapted to be interposed between said sustaining part and bar, whereby the notched portion of the bar is rendered inoperative.

In witness whereof I hereto affix my signature in presence of two witnesses.

JOHN W. PRIDMORE.

Witnesses:
   GEO. W. HENDERSON,
   W. F. PRAUSA.